Oct. 31, 1950     F. C. BYRAM     2,527,673
INTERNAL HELICAL GEAR PUMP
Filed Feb. 28, 1947

INVENTOR.
FREDERICK CAMERON BYRAM.
BY Allen & Allen
ATTORNEYS.

Patented Oct. 31, 1950

2,527,673

UNITED STATES PATENT OFFICE 2,527,673

INTERNAL HELICAL GEAR PUMP

Frederick Cameron Byram, Springfield, Ohio, assignor to Robbins & Myers, Inc., Springfield, Ohio, a corporation of Ohio Application February 28, 1947, Serial No. 731,597

5 Claims. (Cl. 103—117)

My invention relates to rotary pumps, particularly for midget type pumps useful for delivering small quantities of liquid, for example water, in accurate quantities per revolution. The type of pump to which my invention relates is that disclosed in U. S. patent to Moineau No. 1,892,217, to which reference is hereby made for the theoretical features. In such a pump as utilized here, there is a stator and a rotor, the stator being formed with a helical double thread convolution, and the rotor being formed with a single thread convolution which in any cross section is similar to the stator convolution, but which is on a pitch which is half that of the convolutions in the stator. This is what is referred to hereinafter as a Moineau pump or pump assembly. In such a construction the rotor may be driven (as in the present example) while the stator is stationary, and the rotor will in such a case not only revolve but will be required to move through an orbital path of opposite hand to the direction of its rotation. If the stator is driven the rotor must still be free to move orbitally. If the rotor is held in fixed centers (eccentric to the stator), then the stator will have orbital movement.

The problems which are believed to be solved in the present pump have been persistently studied but no solution advanced which has proven to be successful. They are—the production of a midget size pump which will have an efficient delivery with no backleakage—the production of a pump in this small size which can be drained without difficulty—the production of a pump which is highly efficient which postulates close fit throughout, and yet which will start up without excessive momentary loads on the operating motor, thus calling for a motor which is unreasonably oversized for the principal duty which it is to perform.

An apparently available mode of increasing the efficiency of a Moineau type pump is to increase the length of the stator and rotor elements because this gives a longer line of contact between the rotor thread and the stator thread. But in a midget pump the length must be restricted. The use of a hollow rotor so that the drive shaft can be telescoped into the rotor bore, saves in over all length of pump casing, but to obtain a universal joint connection of such a telescope rotor shaft, thus permitting eccentric movement of the rotor (orbital as above noted), requires a bore of ample dimensions, and hence a rotor which is not too small and an eccentricity which is reduced. The capacity of one of these pumps varies directly with the pitch length of the thread in the stator which calls for shallow indentations forming the stator threads, in order to get long pitch length. Shallow indentations cutdown the overall length of line of contact of stator and rotor through any one pitch which calls for extension of the length of the stator and rotor. As a result of the factors which are inconsistent with cutting down overall dimensions of the pump while maintaining capacity and efficiency, it became necessary to work out a structure of contact surface between the rotor and stator which would be extremely efficient to prevent loss through back leakage.

To that end I provide a stator whose inner surface is covered with a bonded-in-place very thin layer of rubber like material. The rubber is made very thin to avoid tendency of it to give resiliently and thus crowd or pile up and oppose the movement of the rotor at one point, and open up the line of contact at another. Yet it permits of close and sealing contact between rotor and stator convolutions, and does not overly bind the rotor when the pump stops.

As an ancillary improvement one of the alternative forms further provides for automatic unseating of the rotor in the stator when the pump stops operations, thereby preventing an overload at starting, since once a discharge pressure builds up, the rotor will seat itself automatically in opposition to the unseating means.

A mode of mounting the stator is provided which leaves a small space which will permit of draining the stator, without provision of any support for the stator except at the intake end, so that the discharge is not cut off from the space in which the stator is located.

Various mechanical means are provided for cutting down the size of the pump casing, connecting rod, etc.

In explanation of statements made in the above introductory remarks, it should be noted that the capacity of a Moineau pump of the type illustrated is equal to 4 times eccentricity of rotor movement times rotor sectional diameter times stator pitch times R. P. M. It will be noted that what has been done here is to increase rotor diameter to permit of a telescoping drive thus permitting some increase in length of the elements without increasing the size of pump casing, and to extend the pitch length of the stator using shallow indentations which means cutting down the eccentricity factor, but keeping down the total number of pitch lengths of the stator for dimensional reasons in overall size of pump. These features require for most effective results, the development of a surface for stator or rotor which will be highly efficient against leakage, yet which will not crowd under the influence of pump operation at high capacity speeds.

The design constants in the particular pump illustrated have been chosen as eccentricity in inches of .040-rotor sectional diameter .890, and stator pitch length 1.200 (of which rotor pitch length is one half). The length of stator is 3.75 inches. In these midget pumps the values determined indicate that relationships should run such that rotor diameter is twenty to thirty times the eccentricity, and that relation of pitch length of stator to rotor diameter X, is from 1.3:1 to 1:1.5. The stator should have at least three pitch lengths, and the pitch length of the stator should not exceed 2 inches at the most.

Figure 1:
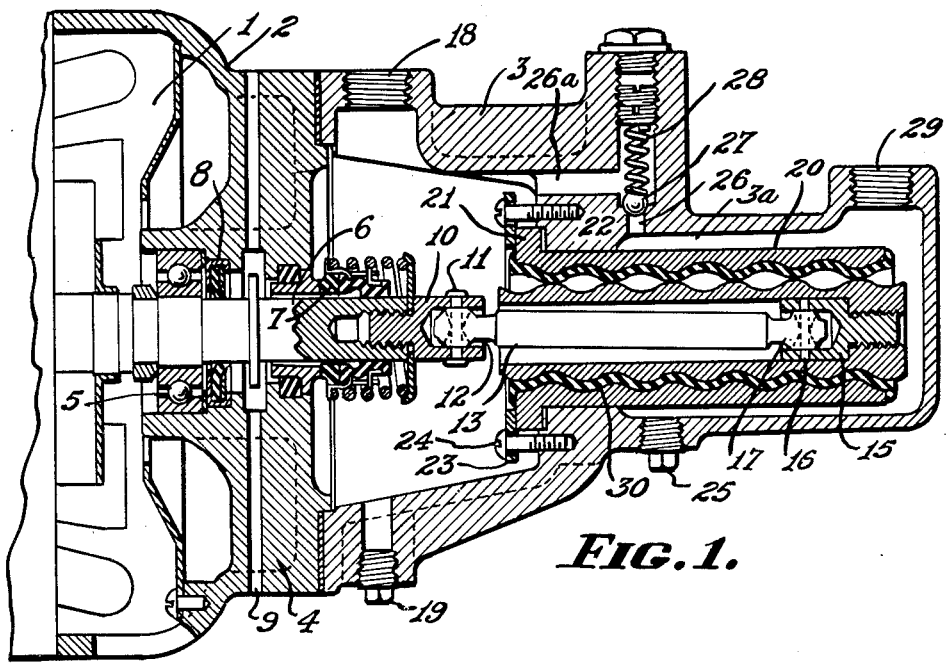
Figure 1 is a central vertical longitudinal section through a pump constructed according to my invention.

Referring now to the drawings, in Figure 1 I show a motor 1 in a casing 2, to which is attached the pump casing 3, preferably a single casting. The end body 4 of the motor casing provides for a ball thrust bearing 5 for the shaft 6 of the motor which is sealed in its passage through the end body as by the rotary seal 7, which may be of a commercial sylphon type. A seal for the bearing as at 8, and a passage through the end body seat 9 to take care of leakage past the seal, is provided. The seal, it will be noted, is on the intake side of the pump.

Attached to the shaft at its outer end within the pump casing is a universal joint element 10 threaded into the end of the shaft. This element mounts a pin 11, which may be riveted in place, which engages in a double conical hole in a ball element 12 (Fig. 1), on the end of the pump shaft 13. The rotor 14 of the pump as shown has a hollow bore, the inner end of which terminates in a threaded socket into which screws another universal joint element 15, with pin 16 engaging in a ball member 17, like that first mentioned, which is the inner terminus of the pump shaft.

The axis of the motor shaft is fixed, the rotor must be caused to revolve by this shaft but must be able to orbit about on an orbit eccentric to its center. The pump shaft must thus assume various angles and the bore of the rotor is such as to accommodate these angles without binding.

The pump casing has an intake at the top as indicated at 18, and at the bottom has a drain plug 19, for draining the casing.

The stator of the pump, shown at 20, is formed with a flange 21 which fits into a countersink in the cross partition 22 cast in the pump casing. A mounting plate 23 is forced down over the stator to hold it in place with the flange 21 on the seat in the partition 22 by means of screws 24.

The pump casing is larger than the stator so as to leave an annular chamber 3a surrounding the projection of the stator from the partition 22. This chamber provides a drainage space for the pump, through a plug 25. Also projecting into this space may be a duct 26 which provides for a safety by-pass. A ball valve 27 held down by a spring 28 closes the duct 26, and a lateral duct 26a therefrom extends into the intake chamber of the pump casing. The discharge outlet for the pump casing may be as indicated at 29.

Referring to the stator, it is first machined or otherwise formed to slightly oversize of its final dimension. The machined piece is then used as the exterior form of a mold, the interior of which is a core shaped accurately as the space to be defined ultimately by the interior of the stator. A rubber compound preferably chiefly of synthetic rubber and of a type used in forming bonded rubber structures, is then forced under high pressure into the mold so formed, which is then vulcanized. The amount of rubber should not be such as to exceed ⅛ inch thick, and may run to 1/64 inch thick. The preferable range is from one to three thirty-seconds inch in thickness, inclusive. The interior surface of the rubber layer as indicated at 30 is such, then as to fit accurately the dimensions of the rotor in accordance with the teachings of the Moineau patent already referred to.

The rotor is preferably of polished metal, and its contact with the rubber liner of the stator will be highly resistant to leakage. Since the rubber is of uniform thickness in this stator, shrinkage in the vulcanizing process can be allowed for accurately. Furthermore there is no more give to the rubber-like material at one point than another, and there is not enough to be crowded by the movement of the stator so as to build up a binding relation, i. e., there is no substantial load deflection of the rubber under pressure, due to the thinness of the layer.

Figure 2:
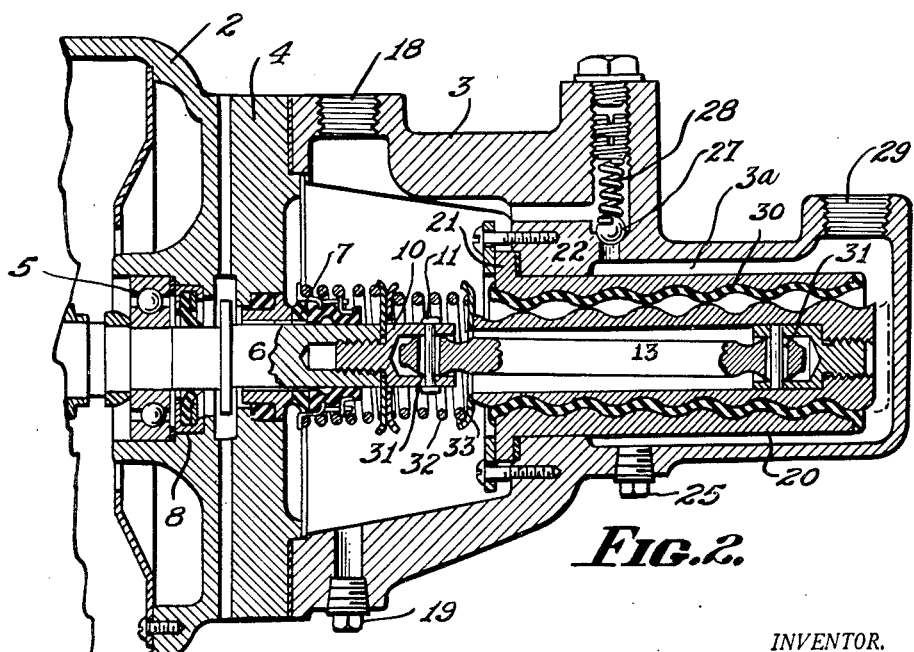
Figure 2 is a like view showing a modification over Figure 1.

In Figure 2 the pump is alike to the pump now described and is marked with the same reference numbers except for the modified or added structure. The stator in this case is formed on a slight taper, expanding toward the discharge end. The rotor likewise is on the same taper. The result of this relation is that if the rotor is slightly displaced lengthwise of the stator, it will be quite free in the stator. With any discharge pressure against it, however, the rotor will seat in proper operating position establishing the typical spiral line of contact with the stator.

The two universal joint connections are modified in that the holes 31 in the ball element on the ends of the pump shaft are extended in a rectangular pattern. This permits tipping of the rotor shaft at right angle to the axis of the driving pins in said universal joint connections, and at the same time permits limited movement of the rotor endwise of the shaft and rotor with relation to the drive shaft, as shown in broken lines at the right hand end of Figure 2.

In order to assure that the tapered rotor will in fact, when the pump comes to a stop, and discharge pressure is relaxed, move to a position out of direct engagement with the stator, a spring 32 is provided bearing on the cap of the rotary seal element on the motor shaft, and bearing on a cap 33 which bears against the intake end of the rotor. By the means now described, the tendency of the rotor to bind when standing idle, thus requiring excessive load on starting on the pump motor is avoided. Thus a motor which is oversize to take care of this load is not required.

A modification useful with the tapered type construction would be one where the rotor was also provided with a thin bonded layer of rubber, to be used with a rubber lined stator or a stator of solid construction.

It should be noted that while the various elements now described work together to the end of providing an efficient midget sized pump of the Moineau type, that the features noted are not all required for effective operation and one or more can be omitted. Thus the tapered rotor-stator structure may be omitted, and if used the spring is not absolutely essential. The relationships of eccentricity, rotor diameter, and stator pitch need not accompany the use of the rubber lined stator for practical operation. The rubber lined stator need not be used with the tapered structure, for practical operation. Each of these features cooperates with the others, however, so that when operating together a very remarkable performance is obtained in a very small size pumping unit.

My invention is applicable to plastic rotor and stator construction instead of metal, in which case the thin rubber-like layer would be vulcanized in situ preferably during cure of the plastic portion.

Having thus described my invention, what I claim as new and desire to secure by Letters Patent is:

1. A rotor and stator construction for small sized pumps comprising a generally cylindrical stator internally grooved with two helical threads, a rotor externally grooved with a single thread of like contour, the pitch of the stator thread being twice that of the rotor thread, said rotor and stator having a slight taper throughout their helically threaded portion, widening toward the discharge end of the assembly, a pump shaft for driving the rotor, said shaft arranged to permit limited movement of the rotor in an axial direction, and auxiliary means for urging the rotor toward the discharge end of the assembly.

2. The combination of claim 1 in which rubber like material is located in the zone of contact of the rotor and stator.

3. The combination of claim 1 in which the stator is formed of a metallic body with a uniform layer of rubber-like material facing the helical threaded portion thereof.

4. A miniature motor driven pump comprising a motor and having a housing end plate and a shaft projecting therethrough and having a bearing therein, a seal for said shaft, a connecting rod secured to said shaft by a universal joint, a hollow rotor having external helical threads secured to said connecting rod by a universal joint at its end remote from said shaft whereby substantially the entire length of said connecting rod is disposed within the hollow portion of said rotor and a one-piece pump casing having inlet and exhaust ports and having rigidly mounted on its inside a stator having internal helical threads, said rotor and stator having a slight taper, widening toward the discharge end of the assembly, said rotor being arranged to permit limited axial movement thereof, and auxiliary means to urge the rotor toward the discharge end of the assembly, said pump casing being secured to said motor housing end plate with said rotor disposed within said stator, said motor housing end plate constituting also a pump casing end plate, said motor shaft constituting a pump shaft, and said motor bearing constituting the pump bearing.

5. The combination of claim 4 in which said stator comprises a solid body faced on its helically threaded portion with a rubber-like material bonded and vulcanized in situ thereon.

FREDERICK CAMERON BYRAM.

REFERENCES CITED

The following references are of record in the file of this patent:

UNITED STATES PATENTS

| Number | Name | Date |
|---|---|---|
| Re. 21,374 | Moineau | Feb. 27, 1940 |
| 888,814 | Jones | May 26, 1908 |
| 1,404,717 | Humphrey | Jan. 24, 1922 |
| 1,505,707 | Hill | Aug. 19, 1924 |
| 1,892,217 | Moineau | Dec. 27, 1932 |
| 2,062,035 | McCormack | Nov. 24, 1936 |
| 2,108,771 | Laird | Feb. 15, 1938 |
| 2,205,919 | Brouse | June 25, 1940 |
| 2,267,459 | Hait | Dec. 23, 1941 |
| 2,290,137 | Aldridge | July 14, 1942 |
| 2,463,341 | Wade | Mar. 1, 1949 |

FOREIGN PATENTS

| Number | Country | Date |
|---|---|---|
| 111,901 | Australia | Nov. 7, 1940 |
| 113,009 | Australia | Apr. 28, 1941 |
| 427,475 | Great Britain | Apr. 15, 1935 |
| 436,843 | Great Britain | Oct. 18, 1935 |
| 446,291 | Great Britain | Apr. 27, 1936 |
| 780,791 | France | Feb. 11, 1935 |